United States Patent [19]

Abe et al.

[11] 4,200,717

[45] Apr. 29, 1980

[54] PREPARATION OF PROPYLENE POLYMER-CONTAINING SOLID TITANIUM TRICHLORIDE AND PROPYLENE POLYMERS USING SAME

[75] Inventors: Toshizo Abe; Nobuaki Goko; Yasuhiro Nishihara; Yukimasa Matuda, all of Kurashiki, Japan

[73] Assignee: Mitsubishi Chemical Industries, Ltd., Japan

[21] Appl. No.: 890,481

[22] Filed: Mar. 27, 1978

[30] Foreign Application Priority Data

Apr. 6, 1977 [JP] Japan .................................. 52-39227
May 11, 1977 [JP] Japan .................................. 52-53029

[51] Int. Cl.² .......................... C08F 4/64; B01J 31/06
[52] U.S. Cl. ................................ 526/159; 252/429 B; 526/142; 526/351; 526/903; 526/904; 527/907; 525/4
[58] Field of Search ............... 526/142, 159, 351, 903, 526/904, 907, 4; 252/429 B

[56] References Cited

U.S. PATENT DOCUMENTS

| | | | |
|---|---|---|---|
| 3,067,183 | 12/1962 | Hagemeyer, Jr. et al. | 526/159 |
| 3,332,925 | 7/1967 | Hay et al. | 526/351 |
| 3,575,948 | 4/1971 | Blunt | 526/903 |
| 3,864,278 | 2/1975 | La Heij et al. | 526/142 |
| 3,893,989 | 7/1975 | Leicht et al. | 526/904 |
| 4,007,133 | 2/1977 | Rust et al. | 526/903 |
| 4,008,177 | 2/1977 | Rust et al. | 526/903 |
| 4,060,593 | 11/1977 | Kazuo et al. | 526/142 |
| 4,064,069 | 12/1977 | Ueno et al. | 526/142 |

FOREIGN PATENT DOCUMENTS

1408620  10/1975  United Kingdom ..................... 526/142

*Primary Examiner*—Stanford M. Levin
*Attorney, Agent, or Firm*—George A. Loud

[57] ABSTRACT

A solid titanium trichloride, produced by precipitation from a homogeneous solution or mixture with an ether, is treated by prepolymerization with propylene at a partial pressure of less than 1 kg/cm². The pretreated titanium trichloride containing a propylene polymer is then admixed with an organoaluminum compound and the admixture is used as a catalyst in the polymerization of propylene.

16 Claims, No Drawings

PREPARATION OF PROPYLENE POLYMER-CONTAINING SOLID TITANIUM TRICHLORIDE AND PROPYLENE POLYMERS USING SAME

BACKGROUND OF THE INVENTION

This invention relates to a method for the preparation of propylene polymer-containing solid titanium trichloride suitable for use as catalyst for the polymerization of propylene and to the preparation of propylene polymers using the propylene polymer-containing solid titanium trichloride so prepared.

A process for preparing polypropylene having high bulk density has long been sought in the art because production of a high density polymer allows elevation of the slurry concentration in the reactor, resulting in an appreciable increase in production capacity. Also, a high concentration of crystalline or isotactic polymer in the product, or in other words, improvement in the stereoregularity of the polymer, leads to certain industrial advantages, such as raising the yield based on raw propylene and decreasing the quantity of non-crystalline polymers dissolved in the diluent, thus allowing a significant simplification or elimination of the process steps required to remove the non-crystalline polymer.

In recent years various methods have been proposed for polymerization of propylene with high catalytic efficiency by use of a high-activity catalyst. Nevertheless, none of these prior art methods has been able to produce the desired polymers having satisfactory bulk density and crystallinity in a high yield, and hence, the solution of this problem is of a paramount industrial significance.

One specific method which has been proposed for improving bulk density and stereoregularity of the polymeric product utilizes a catalyst system containing both titanium trichloride and an organoaluminum compound, which mixed catalyst is subjected to a preliminary treatment at a temperature lower than 60° C. in the presence of propylene (Japanese Patent Publication No. 14865/74). However, this method was merely able to reduce, to some extent, the velocity of decline of bulk density and stereoregularity of the produced polymer which otherwise decline sharply with rise of the polymerization temperature during the high-temperature polymerization after preliminary treatment for obtaining a high catalytic efficiency, and hence this method still fails to meet all industrial requirements. Unfortunately, the improved effect attributed to this method was negligible where the polymerization temperature is within the range of 60° to 70° C. which is the most practical range in actual industrial applications. It is also essential in this method that a suitable quantity of hydrogen be present to prevent "fish-eyes" (gel component) in the molded products produced from the polymer. Maintaining the optimum hydrogen concentration in the polymerization system, however, is often very difficult in actual practice. An excessively low hydrogen loading encourages formation of "fish-eye" in the moldings while an excessively high hydrogen loading results in poor yield of the crystalline polymer. There is also the problem that even if hydrogen and propylene are both fed in predetermined quantities, the hydrogen concentration might vary due to absorption of propylene into solution.

There has been also proposed a method of activating catalysts for propylene polymerization by a technique in which propylene is absorbed gradually at a very low rate into a solution obtained by dispersing, in an inert solvent, alkylaluminum chloride and a δ-type titanium trichloride composition obtained by treating $TiCl_3 \cdot \frac{1}{3}AlCl_3$ or β-type titanium trichloride containing $AlCl_3$ with a complexing agent and then pulverizing it. (Japanese Patent Laid-Open No. 108693/76). This method, however, does not allow a high propylene feed rate and, accordingly, a long time is required for the propylene absorption treatment.

SUMMARY OF THE INVENTION

The present invention provides a solid titanium trichloride catalyst containing a propylene polymer component which serves as an optimal catalyst component and enables the production of propylene polymers having high bulk density and crystallinity with excellent catalytic efficiency. Preparation of the catalyst is characterized in that substantially a whole quantity of propylene supplied is immediately absorbed by a special $TiCl_3$ in a short time prepolymerization treatment without excessive elevation of the degree of propylene polymerization. The prepolymerization treatment (pretreatment) is effective even in the absence of hydrogen and can be accomplished at any temperature over a wide specified range.

One objective of this invention is to provide a method of producing propylene polymers having high bulk density and crystallinity with high catalytic efficiency, such polymers being capable of producing moldings free of "fish-eye."

Other objects and advantages of the present invention will become apparent from a reading of the detailed description to follow.

DESCRIPTION OF THE PREFERRED EMBODIMENTS

As previously noted the present invention involves a prepolymerization treatment of a special solid titanium trichloride. The solid titanium trichloride, which is subjected to the prepolymerization treatment, is precipitated from a homogeneous solution or mixture comprising titanium trichloride and an ether at a temperature of lower than 150° C. and is then mixed in a vessel with an inert solvent and an organoaluminum compound. Propylene is then supplied to the closed vessel for adsorption into the liquid phase, at a partial pressure of the said propylene in the gaseous phase which is maintained at less than 1 kg/cm².

Another aspect of the invention is provision of a method of producing propylene polymers characterized by polymerizing propylene by using, as a catalyst, (1) a solid titanium trichloride containing a propylene polymer obtained according to the first aspect of this invention described above and (2) an organoaluminum compound.

A. Preparation of solid $TiCl_3$

Before entering into a discussion of the present invention, titanium trichloride precipitated from a homogeneous solution or mixture containing titanium trichloride (hereinafter referred to as "liquid titanium trichloride") in the presence of an ether, at a temperature of lower than 150° C., will be described. These methods, which are disclosed in U.S. Pat. No. 4,060,593 include:

(A) A method wherein solid titanium tetrachloride is reduced with an organoaluminum compound in the presence of an ether and, if necessary, a suitable hydrocarbon solvent.

(B) A method wherein solid titanium trichloride, used as starting material, is treated with an ether in the presence, if necessary, of a hydrocarbon solvent.

Reviewing first the method (A), it is possible to employ a wide variety of ethers in this method, but it is preferred to use the ethers of the type soluble in hydrocarbon solvents, such as those represented by the following general formula (1):

$$R^1OR^2 \qquad (1)$$

wherein $R^1$ and $R^2$ independently represent an alkyl group, an aralkyl group, an alkenyl group, an aryl group or an alkaryl group, which groups may be the same or different.

As specific examples of suitable ethers, the following may be cited: dialkyl ethers such as di-n-amyl ether, di-n-butyl ether, di-n-propyl ether, di-n-hexyl ether, di-n-heptyl ether, di-n-octyl ether, di-n-decyl ether, di-n-dodecyl ether, di-n-tridecyl ether, n-amyl-n-butyl ether, n-amylisobutyl ether, n-amylethyl ether, n-butyl-n-propyl ether, n-butylisoamyl ether, n-ethyl-n-hexyl ether, n-propyl-n-hexyl ether, n-butyl-n-octyl ether, n-hexyl-n-octyl ether; dialkenyl ethers such as bis(1-butenyl)ether, bis(1-octenyl)ether, bis(1-decynyl)ether, (1-octenyl-9-decynyl)ether; diaralkyl ethers such as bis(benzyl)ether; dialkaryl ethers such as bis(tolyl) ether, bis(xylyl)ether, bis(ethylphenyl)ether, tolylxylyl ether; alkylalkenyl ethers such as propyl-1-butenyl ether, n-octyl-1-decynyl ether, n-decyl-1-decynyl ether; alkylaralkyl ethers such as n-octyl-benzyl ether, n-decyl-benzyl ether; alkylaryl ethers or alkylalkaryl ethers such as n-octylphenyl ether, n-octyl-tolyl ether, n-decyl-tolyl ether; aralkylalkenyl ethers such as 1-octenyl-benzyl ether; arylalkenyl ethers or alkarylalkenyl ethers such as 1-octenyl-phenyl ether, 1-octenyl-tolyl ether; and aralkylaryl ethers or aralkylalkaryl ethers such as benzylphenyl ether and benzyltolyl ether. Most preferred are the ethers of the above-shown formula (1) wherein $R^1$ and $R^2$ each independently represent a linear hydrocarbon radical such as a normal alkyl or normal alkenyl group.

The hydrocarbon solvent optionally used as needed in the above-mentioned method (A) may be selected in accordance with the type of ether used. The preferred hydrocarbon solvents usable in this method include, for example, saturated aliphatic hydrocarbons such as n-pentane, n-hexane, n-heptane, n-octane and n-dodecane and liquid parafins; alicyclic hydrocarbons such as cyclohexane and methyl cyclohexane; and aromatic hydrocarbons such as benzene, toluene, xylene, 1,2,4-trimethylbenzene and ethylbenzene. Where one or both of $R^1$ and $R^2$ of the ether of formula (1) is an alkyl group or alkenyl group with not more than 5 carbon atoms, the hydrocarbon solvent is selected preferably from among the aromatic hydrocarbons and less preferably from the alicyclic hydrocarbons. Where $R^1$ and $R^2$ are each alkyl or alkenyl groups with more than 6 carbon atoms, the hydrocarbon solvent is preferably a saturated aliphatic hydrocarbon.

The organoaluminum compound used as a reducing agent in the previously described method (A) is selected from the organoaluminum compounds represented by the following general formula (2):

$$AlR_n^3X_{3-n} \qquad (2)$$

wherein $R^3$ is a hydrocarbon group of 1 to 20 carbon atoms, n is an integer of 1 to 3, and X is a halogen atom. The preferred organoaluminum compounds for use in this method are those of the above-shown general formula (2) wherein $R^3$ is an alkyl group of 1 to 10 carbon atoms, and most preferred are ethylaluminum sesquichloride, diethylaluminum chloride, trialkylaluminum and the like.

The amount of organoaluminum compound used in the reduction of titanium tetrachloride should be such that the ratio of titanium tetrachloride to organoaluminum compound falls in the range of from 1:0.1 to 1:50, preferably 1:0.3 to 1:10, in terms of the molar ratio of titanium to $R^3$ (a hydrocarbon group, preferably an alkyl group) in the organoaluminum compound of the general formula (2).

The recommended amount of the ether, as calculated in terms of molar ratio of ether to titanium tetrachloride, is within the range of 1:0.05 to 1:5, preferably 1:0.25 to 1:2.5.

The reduction can be accomplished by various methods including the following:

(a) A homogeneous liquid consisting of titanium tetrachloride and an ether is mixed with an organoaluminum compound.

(b) A homogeneous liquid consisting of an organoaluminum compound and an ether is mixed with titanium tetrachloride.

(c) A homogeneous liquid consisting of titanium tetrachloride and an ether is mixed with a homogeneous liquid consisting of an organoaluminum compound and an ether.

(d) Titanium tetrachloride, an ether and an organoaluminum compound are mixed in any desired order at a temperature not inducing a reducing reaction, for example, at lower than $-30°$ C., and then this mixture is heated to the specified reduction temperature.

The titanium tetrachloride, ether and organoaluminum compound used in any of these methods may be used either in an undiluted form or after dilution with a suitable hydrocarbon solvent, but the organoaluminum compound is preferably used after dilution with a hydrocarbon solvent.

The reduction of titanium tetrachloride with an organoaluminum compound in the presence of an ether as described above gives a liquid product. This product is a homogeneous solution or mixture comprising titanium trichloride and ether, which product is soluble in hydrocarbon solvents and brown or greenish brown in color.

The method (B), where solid titanium trichloride used as the starting material is treated with an ether in the presence, if necessary, of a suitable hydrocarbon solvent to obtain a liquid titanium trichloride, is as follows.

The solid titanium trichloride used in this method may be, for example, (1) the type obtained by reducing titanium tetrachloride with hydrogen gas, aluminum or an organometallic compound of aluminum; (2) the type obtained by pulverizing type (1) in a ball mill; (3) the type obtained by further heating the pulverized titanium chloride of type (2); or (4) the type obtained by refining the thus produced solid titanium trichloride of type (1)–(3) to remove impurities.

The same ethers and hydrocarbon solvents (which are introduced as needed) as mentioned in connection with the method (A) above may be used for obtaining the liquid titanium trichloride preparation in the method (B).

The amount of the ether used in this method (B) is selected so that the molar ratio of ether to titanium trichloride is greater than 1, preferably within the range of 1 to 5. The ether treatment of solid titanium trichloride may be accomplished by merely mixing them in any suitable manner. It is recommended that this treatment be conducted in the presence of a hydrocarbon solvent which is suitably selected in accordance with the type of the ether used, as in the case of the method (A) previously described. The process of method (B) provides the same liquid product as obtained in method (A).

Thus, either of the above-described methods (A) and (B) is capable of producing a suitable liquid titanium trichloride. This liquid product may be heated as is or, if necessary, after addition of a hydrocarbon solvent such as mentioned above, at a temperature lower than 150° C., usually within the range of 20° to 150° C., preferably 40° to 120° C., more preferably 60° to 100° C., and maintained at the same temperature for a certain period of time, to produce a finely granulated titanium trichloride as a precipitate.

B. Prepolymerization

In the prepolymerization of the present invention, the thus obtained finely granulated, solid titanium trichloride is mixed with an inert solvent and an organoaluminum compound. The organoaluminum compound used here is of the type represented by the following general formula (4):

$$AlR_m^4X_{3-m} \qquad (4)$$

wherein $R^4$ is a saturated or unsaturated hydrocarbon group or groups, each group having 1 to 20 carbon atoms and wherein the groups may be the same or different, X is halogen, and m is 1.5, 2 or 3. Examples of such organoaluminum compounds include: trialkylaluminums, such as trimethylaluminum, triethylaluminum, triisobutylaluminum, trihexylaluminum, etc., and alkylaluminum halides such as dimethylaluminum chloride, diethylaluminum chloride, diethylaluminum bromide, ethylaluminum sesquichloride, etc. Mixtures of aluminum halide and trialkylaluminum, indenyldiethylaluminum, indenyldipropylaluminum, indenylisobutylaluminum and the like may also be used. Preferred examples are dialkylaluminum halides, and most preferred is diethylaluminum chloride.

The inert solvent used along with organoaluminum compound in this invention may be an inert hydrocarbon solvent of the type commonly employed for olefin polymerization, and may be an aliphatic hydrocarbon, an alicyclic hydrocarbon or an aromatic hydrocarbon. Preferred solvents are normal hexane, normal heptane and the like.

Although the amount of solid titanium trichloride dispersed in the inert solvent is generally not critical, it is important to keep its concentration within a certain range. It is recommended that the titanium trichloride be dispersed in the solvent in an amount of 1 to 50 gr, preferably 5 to 30 gr, per liter of the inert solvent. Lower titanium trichloride concentrations favor the formation of "fish eye" in the molded polymeric products obtained by polymerizing propylene using the solid titanium trichloride as a catalyst. From an industrial viewpoint, it is desirable to select as high a concentration as possible within the range where normal agitation can be maintained.

The amount of the organoaluminum compound is such that the molar ratio thereof to solid titanium trichloride is usually within the range of 0.1 to 2, preferably 0.5 to 1.0.

The mixture of solid titanium trichloride, inert solvent and organoaluminum compound is put into a closed vessel, to which propylene is subsequently introduced for a prepolymerization treatment. In the prepolymerization treatment, propylene is usually blown into the vessel at a temperature of from 0° to 70° C., preferably 35° to 60° C. Higher temperatures adversely affect the bulk density of the polymer obtained from the principal (subsequent) polymerization of propylene (using the polymer-containing solid titanium trichloride as a catalyst) and also tend to lower the yield of the crystalline polymer. Lower temperatures lead to a diminution of the temperature difference between cooling water and the propylene/TiCl₃ mixture and, therefore, lead to difficulties in heat removal.

The prepolymerization catalyst treatment of the present invention features a high feed rate of propylene into the vessel which contains a mixture of the solid titanium trichloride, inert solvent and organoaluminum compound. The feed rate for propylene in this invention is usually 1 to 10 gr, preferably 1 to 5 gr per hour, per gr of solid titanium trichloride. Any higher feed rate makes it difficult to control the reaction temperature, while any lower feed rate results in an excessively long time for polymerization which is undesirable from an industrial viewpoint. What is most important during this propylene feeding to the vessel is maintaining a partial pressure of propylene in the gaseous phase at less than 1 kg/cm². When the propylene is fed into the liquid phase within the vessel, it is desirable to maintain the partial pressure of propylene in the gaseous phase at less than 0.2 kg/cm², preferably almost at zero. When the propylene is fed into the gaseous phase within the vessel, it is desirable to keep the partial pressure of propylene in the gaseous phase at less than 0.6 kg/cm². Any higher partial pressure of propylene may lead not only to an unsatisfactory bulk density of the polymers obtained from the subsequent principal polymerization of propylene but also to an increase of "fish-eye" in the molds of the polypropylene produced by the main or principal polymerization reaction. The partial pressure of propylene is determined by the balance between the propylene feed rate and the propylene absorption rate, but the partial pressure can easily be controlled where the preferred solid titanium trichloride is treated under the optimum conditions. The partial pressure of propylene may be checked by an analysis of the gaseous phase, but as a practical matter, observation with a pressure gauge provided on the vessel above the liquid level usually suffices.

In the prepolymerization treatment a propylene polymer is produced by contact of the solid titanium trichloride with propylene. The amount of polymer product by this pretreatment will range from 0.1 to 50 gr per gr of solid titanium trichloride.

In the prepolymerization of this invention, the presence of hydrogen is not required in the reaction environment, and no "fish-eye" is produced in the polymeric products even when no hydrogen is present in the reaction environment. Moreover, the presence of hydrogen could adversely affect the polymer bulk density and crystalline polymer yield. In this invention, therefore, it is recommended that the pretreatment of the catalyst with propylene be conducted without any substantial amount of hydrogen being present. Thus, the absence of hydrogen is a highly desirable, but not an essential condition.

It is also possible in this invention to introduce with the propylene feed, a small quantity of another α-olefin such as ethylene, butene-1, 4-methylpentene-1, etc. The amount of such α-olefin or α-olefins added should be within a range where the properties of the polypropylene product are not substantially affected. When used, the α-olefin is preferably added in an amount of less than 5 wt% based on propylene.

The propylene polymer-containing solid titanium trichloride produced by the above-described pretreatment (prepolymerization) process is separated from the liquid phase containing the unreacted material, inert solvent and other impurities by a conventional separation technique such as decantation, filtration, centrifugation, etc., and then further washed several times with a solvent. It is advisable to use the same inert hydrocarbon solvent which was employed in the pretreatment with propylene.

The washing should reduce the amount of residual solvent from the inert solvent used in the propylene pretreatment to less than 20%.

C. Production of Polypropylene

In the above-described manner, there is obtained a solid titanium trichloride containing a propylene polymer according to the first-mentioned aspect of this invention. This product is mixed afresh with an organoaluminum compound and used as a catalyst in the main polymerization (principal polymerization) of propylene.

The organoaluminum compound added in the principal polymerization step may be the same as that used in the pretreatment step, that is, the type of aluminum compounds represented by the above general formula (2). It is usually preferable to use the same organoaluminum compound as employed in the pretreatment step, but it is of course possible, or preferred in some cases, to use a different kind of organoaluminum compound. For example, use of a dialkylaluminum monohalide in the pretreatment step and of a trialkylaluminum in the principal polymerization has proven successful.

In the principal polymerization, the organoaluminum compound is usually used in an amount of 0.1 to 100 times, preferably 2 to 10 times, the molar amount of the propylene polymer-containing solid titanium trichloride compound.

According to the propylene polymerization method of this invention, it is possible to obtain a satisfactorily high crystalline polymer yield by using, as a catalyst, a combination of the propylene polymer-containing solid titanium trichloride and an organoaluminum compound, but it is also possible to additionally add a third component to the catalyst composition for further increasing the polymer yield or for providing additional improvement in the propylene polymerization.

In the principal polymerization of propylene, the propylene polymer-containing solid titanium trichloride and organoaluminum compound (and if need be, a third component) are simply mixed by any suitable method. The principal polymerization (using the novel catalyst) may be conducted in accordance with a conventional polymerization operational technique such as slurry polymerization or vapor phase polymerization, either in a continuous or batchwise manner, under the conditions that the partial pressure of propylene in a gaseous phase is 1 to 100 atm., preferably 5 to 30 atm., and the temperature is at 50° to 90° C., preferably 60° to 70° C. The partial pressure of propylene in the principal polymerization is required to be greater than that in the prepolymerization. In the case of slurry polymerization, an inert solvent of the same type as employed in the pretreatment of the titanium trichloride, more specifically, a hydrocarbon such as hexane, heptane, cyclohexane, benzene, toluene, pentane, butane or propane, is used as the polymerization medium. It is also possible to utilize propylene itself as the polymerization solvent.

A known type of molecular weight regulator such as hydrogen or diethylzinc may be suitably added to regulate the molecular weight of the polymer product.

The principal polymerization of propylene, usually produces polypropylene in a yield of more than 5,000 gr, preferably more than 7,000 gr, per gr of solid titanium trichloride.

In the principal polymerization of this invention, propylene alone may be polymerized, but it is also possible to mix another α-olefin or other α-olefins of the same type as are optional in the pretreatment step, such as ethylene, butene-1,4-methylpentene-1, etc. The amount of such α-olefin or α-olefins added should be limited to within a range where the properties of the polypropylene remain unaffected. It is usually suggested to use the additional α-olefin where necessary, in an amount of less than 5 wt% based on the weight of the propylene reactant.

As can be appreciated from the foregoing description, the propylene polymers obtained by polymerizing propylene according to the method of this invention, by using the propylene polymer-containing solid titanium trichloride of this invention as one catalyst component, have high bulk density and stereoregularity. A bulk density of 0.50 g/cc or more and a boiled heptane extraction residue of higher than 98% can be easily attained.

The present invention is credited with the following contributions to advancement of the art.

One contribution of this invention is striking enhancement of polypropylene production capacity. This is attributable to the improved bulk density and stereoregularity of the polymers provided by the present invention. More specifically, since the polymer obtained according to the method of this invention has high bulk density, it retains excellent fluidity even when it is suspended in hexane and the slurry concentration is as high as 50%. Such excellent fluidity leads to a surprisingly high polymer productivity. Also, owing to reduced generation of non-crystalline polymers, their ill effects such as rise of viscosity of the polymerization system, adhesion of material to the pipes and other parts of the vessel, and so forth, are minimized to realize an appreciable improvement in productivity in terms of operational safety.

In view of the fact that the non-crystalline polymers are not only of little or no industrial or economic value, but also require a large amount of apparatus for treatment, it may be said that the present invention simplifies and reduces apparatus by substantial reduction of the amount of non-crystalline polymer produced.

A third benefit provided by this invention is provision of polymers which have excellent mechanical properties in spite of extremely high stereoregularity. In the case of the propylene polymers obtained according to ordinary polymerization methods, if the boiled heptane extraction residue in the products exceeds 98%, the pressed articles, although possessing elevated yield strength, suffer from unacceptably low impact strength, that is, they become "hard and fragile". On the other hand, the polymers obtained according to the method of this invention show no noticeable drop in impact strength even if the boiled heptane extraction residue exceeds 98%. Although this phenomenon has not yet been definitely elucidated, it is believed attributable to the fact that the propylene polymers produced according to the method of this invention retain a heteroblock structure even when the boiled heptane extraction residue is very high. Thus, it may be said that the present invention realizes a significant improvement in yield of stereoregular polymers, improved industrial productivity and simplification of apparatus requirements without any reduction in mechanical properties.

The present invention will next be described further by working examples, but it will be understood that the scope of the invention is in no way indicated by these particular examples and that the invention may be embodied in other forms without departing from the scope of the invention.

In the following Examples and Comparative Examples, the following abridged notations are used: $K_o$ (polymerization activity) is the total amount of production (gr) of propylene polymer per gr of titanium trichloride catalyst component per $kg/cm^2$ of propylene pressure per one hour; I.I. (isotactic index) is the amount of residue (wt%) after 6-hour extraction with boiled n-heptane in modified Soxhlet's extractor; $I.I._o$ is I.I. of the total propylene polymer product and indicates the yield of the crystalline polymer in the whole product; thus, an $I.I._o$ of 100% indicates a 100% isotactic product; $\rho_B$ is bulk density (unit: g/cc) measured according to JIS-6721; MFI is melt flow index measured according to ASTM D-1238. Tensile impact strength was measured according to ASTM D-1822.

Also, the following abridged notations were used in the tables: TPP—triphenyl phosphine; EB—ethyl benzoate; PHA—phenyl acetate; pp—polypropylene; Pppy—Partial propylene pressure in gaseous phase; ppy—propylene; CRE—crotonic acid ethyl ester. The "catalyst feed rate" in the polymerization step is the feed rate of the propylene polymer-containing solid titanium trichloride, and the values thereof were calculated as $TiCl_3$.

EXAMPLES 1 TO 5

(a) Preparation of solid titanium trichloride 5.5 liters of purified n-hexane was fed at room temperature into a nitrogen-displaced 10-liter autoclave. 630 gr of n-octylether, 630 gr of titanium tetrachloride and 132 gr of diethylaluminum chloride were then added with agitation to obtain a brown homogenous solution. This solution was gradually heated to 95° C. Fine granular purple solids were observed to precipitate as the temperature rose above about 50° C. After maintaining the solution at 95° C. for approximately one hour, the granular purple solids were separated and washed with n-hexane to obtain 410 gr of solid titanium trichloride.

(b) Preparation of titanium trichloride containing propylene polymer (Pretreatment)

5 liters of purified n-hexane were placed in a nitrogen-padded 10-liter autoclave, and then 39 gr of diethylaluminum chloride and 100 gr (calculated in terms of $TiCl_3$) of solid titanium trichloride obtained in (a) above were introduced. This solution was heated to the temperatures shown in Table 1, and then propylene gas was injected into the liquid phase of the mixed solution at the rates and for the periods shown in Table 1 to effect polymerization. During this polymerization operation, pressure variation in the gaseous phase was less than $0.05 \text{ kg/cm}^2$ and no propylene was detected in the gaseous phase (detection sensitivity: 1%).

Then, the solid product was allowed to settle out and, after removing the supernatant by decantation, the product was washed several times with n-hexane to obtain a propylene polymer-containing solid titanium trichloride.

(c) Polymerization of propylene (principal polymerization)

750 ml of refined n-hexane, 156 mg of diethylaluminum monochloride, 40 mg (calculated in terms of $TiCl_3$) of the propylene polymer-containing solid titanium trichloride obtained in (b) above and a third component (a compound shown in Table 1 in an amount of 0.1 times the molar amount of $TiCl_3$) were fed into a dried and nitrogen-displaced SUS 304 autoclave (with a capacity of 2 liters), followed by addition of $0.5 \text{ kg/cm}^2$ of hydrogen. The solution was heated under agitation to the temperatures shown in Table 1 and then propylene was introduced until the total pressure rose to 13.5 $kg/cm^2$ (partial pressure of propylene is 12 $kg/cm^2$) and, at this pressure, polymerization was continued for 5 hours. After completion of the polymerization reaction, the unreacted monomer gas was immediately purged out and then the reaction product in the autoclave was sampled to determine the total I.I. The remaining polymer was treated with n-hexane to extract out the soluble polymer and then dried to obtain a white powdery polypropylene. The bulk density of each of the thus obtained polymers (Examples 1 to 5) is shown in Table 1. Each polymer product was then mixed with 2,6-di-t-butyl-P-methylphenol (BHT) as an antioxidant (0.2 wt% based on the polypropylene), pelletized with a 20 mm-aperture pelletizer and further formed into a pressed sheet for measurement of impact strength. The results are shown in Table 1.

COMPARATIVE EXAMPLES 1-2

The solid titanium trichloride obtained in (a) of Example 1 was mixed with an organoaluminum compound and a third component as shown in Table 1 without pretreatment (b) of Example 1 and then used for propylene polymerization in the same manner as described in (c) of the same example. The results are shown in Table 1. It is apparent from the results of Table 1 that the polymers obtained without the prepolymerization, even though using a solid titanium trichloride precipitated from liquid titanium trichloride in the presence of an ether at a temperature of lower than 150° C., suffer from a decreased amount of crystalline component, as indicated by low values for $I.I._o$, and also low bulk density in comparison with the products of Examples 1 and 2. The moldings formed from such polymers are also comparatively poor in impact strength.

Table 1

| | Pretreatment step | | | | | Principal polymerization | | | Results | | | | |
|---|---|---|---|---|---|---|---|---|---|---|---|---|---|
| | Temp. (°C.) | ppy feed rate (g · ppy/g · $TiCl_3$ · hr) | Pppy (kg/cm²) | Period (hr) | Product composition (g · pp/ g · $TiCl_3$) | Temp. (°C.) | 3rd component | Polymer production (g) | $K_o$ | $I.I._o$ (wt %) | $\rho_B$ (g/cc) | MFI | Tensile impact strength (kg · cm/ cm²) |
| Example 1 | 55 | 2.0 | <0.05 | 1.5 | 3 | 60 | TPP | 348 | 145 | 98.4 | 0.46 | 4.0 | 62 |
| Comp. Example 1 | — | — | — | — | — | 60 | TPP | 320 | 133 | 92.6 | 0.20 | 4.2 | 50 |
| Example 2 | 55 | 4.0 | <0.05 | 1.0 | 4 | 60 | — | 360 | 150 | 93.5 | 0.46 | 4.2 | 65 |
| Comp. Example 2 | — | — | — | — | — | 60 | — | 348 | 145 | 88.5 | 0.22 | 4.5 | 50 |
| Example 3 | 55 | 1.5 | <0.05 | 2.0 | 3 | 70 | EB | 360 | 150 | 97.5 | 0.46 | 4.9 | 64 |
| Example 4 | 5 | 1.5 | <0.05 | 2.0 | 3 | 65 | PHA | 360 | 150 | 97.5 | 0.46 | 5.1 | 63 |
| Example 5 | 65 | 2.0 | <0.05 | 1.0 | 2 | 65 | PHA | 348 | 145 | 96.5 | 0.44 | 5.5 | 66 |

EXAMPLES 6-7

17 liters of n-hexane, 132 gr of diethylaluminum chloride and about 400 gr of solid titanium trichloride obtained in the manner described in Example 1(a) (330 gr calculated as titanium trichloride) were fed into a nitrogen-displaced 20-liter reactor. Then the mixed solution was heated to the temperatures shown in Table 2 and propylene gas was injected into the liquid phase at the feed rates and for the periods shown in Table 2. During this operation, the pressure variation was less than 0.05 kg/cm². Then the solid product was allowed to settle out, and after removing the supernatant by decantation, the product was washed several times with n-hexane to obtain a propylene polymer-containing solid titanium trichloride.

Then the thus obtained propylene polymer-containing solid titanium trichloride, diethylaluminum monochloride, n-hexane, propylene, hydrogen and the third catalyst component shown in Table 2 were supplied continuously into a 400-liter reactor and continuously polymerized under a total pressure of 13.5 kg/cm² (gauge pressure) (partial pressure of propylene is 12 kg/cm²) with an average retention time of 5 hours at the temperatures shown in Table 2. The polymerization activity ($K_o$) as determined from the polymer production rate and feed rate of the propylene polymer-containing solid titanium trichloride is shown in Table 2.

The polymer slurry was purged of unreacted propylene in a degassing tank, then mixed with isopropanol so that the isopropanol concentration in the inert solvent solution was 5%, and then, after continuous treatment at 70° C., the slurry was separated into a polymer cake and filtrate by a centrifugal separator. The product polypropylene was recovered in a powdery form from the cake through a drying step, while the non-crystalline polymer dissolved in the solvent was separated in a concentrated form from the filtrate and recovered. The ratio of the thus obtained non-crystalline polymer to the whole polymer product is shown in Table 2 as non-crystalline polymer yield.

The powder product thus obtained was mixed with 0.2% of BHT as an antioxidant, pelletized at 250° C. with a pelletizer having an inner diameter of 40 mm and then formed into a 30μ water-cooled inflation film. This film was cut to 150 cm × 10 cm and the number of "fish-eyes" greater than 0.1 mm in diameter was counted. The results are shown in Table 2.

COMPARATIVE EXAMPLE 3

A solid titanium trichloride obtained after the manner of Example 1 was treated in the same way as Example 7 except that the partial pressure of propylene gas in the gaseous phase in the pretreatment step was maintained at 1.2 kg/cm², thereby producing a propylene polymer-containing titanium trichloride. The succeeding continuous propylene polymerization and film formation were as described in Example 7. The results are shown in Table 2. As indicated in the table, the 30μ water-cooled film obtained from this comparative example had numerous "fish-eyes".

EXAMPLE 8

A solid titanium trichloride obtained in the manner described in (a) of Example 1 was subjected to the same pretreatment as in Example 6 but using a propylene-ethylene mixed gas (with 3% ethylene content) instead of propylene gas, and a propylene-ethylene copolymer-containing solid titanium trichloride catalyst was thus prepared. The remainder of the operation was performed by following the same procedure as Example 6 except that, in the continuous polymerization of propylene at 60° C., ethylene was supplied continuously so that the ethylene units in the product polymer amounted to 4 wt%. The results are shown in Table 2.

COMPARATIVE EXAMPLE 4

Propylene-ethylene polymerization was carried out in the same manner as Example 8 except that a solid titanium trichloride obtained as described in Example (a) was used for the continuous polymerization without undergoing the pretreatment. The results are shown in Table 2.

The results of Example 8 and Comparative Example 4 indicate that the pretreatment of this invention is very effective in improving the yield of the crystalline polymer and bulk density of the product powder.

COMPARATIVE EXAMPLE 5

15 liters of n-hexane, 121 gr of diethylaluminum chloride and 400 gr of commercially available titanium trichloride ($TiCl_3 \cdot \frac{1}{3}AlCl_3$) were fed into a nitrogen-padded 20-liter reactor. After heating the solution to 40° C., propylene gas was injected into the liquid phase at the rate of 460 g/hr for 2 hours. The rise in pressure as read on a pressure gauge in communication with the gaseous phase during this operation was less than 0.15 kg/cm². Thereafter, the process of Examples 6-7 was repeated to obtain a propylene polymer-containing solid titanium trichloride, followed by a continuous polymerization of propylene with that catalyst in the manner described in and sheet formation were performed in the same way as in Example 1. The results are shown in Table 3.

Table 3

| | Pretreatment step | | | | | Principal polymerization | | Results | | | | |
|---|---|---|---|---|---|---|---|---|---|---|---|---|
| | Temp. (°C.) | ppy feed rate (g . ppy/g . TiCl$_3$ . hr) | Pppy (kg/cm$^2$) | Period (hr) | Product Composition (g . pp/ g . TiCl$_3$) | Temp. (°C.) | 3rd component | Polymer production (g) | $K_o$ | I.I.$_o$. (wt %) | $p_B$ (g/cc) | MFI | Tensile impact strength (kg . cm/ cm$^2$) |
| Ex. 9 | 55 | 1.5 | 0.2 | 2.0 | 3.0 | 60 | TPP | 350 | 146 | 98.5 | 0.47 | 4.5 | 65 |
| Ex. 10 | 40 | 2.8 | 0.4 | 1.5 | 4.2 | 60 | — | 370 | 154 | 94.5 | 0.46 | 4.2 | 63 |
| Ex. 11 | 55 | 2.9 | 0.3 | 1.5 | 4.3 | 70 | EB | 355 | 148 | 97.0 | 0.46 | 3.5 | 68 |
| Ex. 12 | 60 | 3.3 | 0.3 | 1.5 | 5.0 | 65 | PHA | 360 | 150 | 97.5 | 0.43 | 6.0 | 62 | connection with Examples 6–7, obtaining the results shown in Table 2.

It is apparent from these results that if the process of this invention is performed by using commercially available AA type titanium trichloride in place of the solid titanium trichloride of this invention, valueless non-crystalline polymer is produced.

EXAMPLES 13–14

17 liters of n-hexane, 132 gr of diethylaluminum chloride and approximately 400 gr of solid titanium trichloride (330 gr when calculated as titanium trichloride) obtained as described in Example 1(e) were fed into a nitrogen-displaced 20-liter reactor, and after heating the Table 2

| | Pretreatment | | | | | Principal polymerization step | | | | Results | | | |
|---|---|---|---|---|---|---|---|---|---|---|---|---|---|
| | Temp. (°C.) | ppy feed rate (g . ppy/g . TiCl$_3$ hr) | Pppy (kg/cm$^2$) | Treating time (hr) | Product Composition (g . pp/ g . TiCl$_3$) | Temp. (°C.) | 3rd component | Polypropylene production rate (kg/ hr) | Non-crystalline production rate (kg/hr) | Catalyst feed rate (g . TiCl$_3$ /hr) | $K_o$ | Non-crystalline Polymer yield (%) | $p_B$ (g/ cc) | Nr. of fish eyes/ 1500 cm$^2$ |
| Ex. 6 | 60 | 2.0 | <0.05 | 1.5 | 3 | 65 | CRE | 18.9 | 0.42 | 2.25 | 140 | 2.2 | 0.49 | 8 |
| Ex. 7 | 40 | 2.0 | <0.05 | 3 | 6 | 60 | TPP | 18.9 | 0.32 | 2.42 | 130 | 1.7 | 0.49 | 9 |
| Comparative Ex. 3 | 40 | 60 | 1.2 | 0.15 | 9 | 60 | TPP | 18.9 | 0.36 | 2.42 | 130 | 1.9 | 0.49 | >500 |
| Ex. 8 | 60 | 2.0 | <0.05 | 1.5 | 3 | 60 | TPP | 16.5 | 0.58 | 1.72 | 160 | 3.5 | 0.48 | 8 |
| Comparative Ex. 4 | — | — | — | — | — | 60 | TPP | 16.5 | 1.98 | 1.96 | 140 | 12 | 0.41 | 10 |
| Comparative Ex. 5 | 40 | 1.5 | <0.15 | 2 | 3 | 60 | TPP | 16.5 | 1.40 | 10.2 | 27 | 8.5 | 0.44 | 32 |

EXAMPLES 9–12

The solid titanium trichloride obtained in Example 1(a) was treated in the same manner as Example 1 except that, in the pretreatment described in (b) of the same example, propylene gas was supplied into the gaseous phase of the vessel, at the feed rates and for the periods shown in Table 3, thereby obtaining a propylene polymer-containing titanium trichloride.

Then 750 ml of purified n-hexane, 156 mg of diethylaluminum monochloride, 40 mg (calculated as TiCl$_3$) of the propylene polymer-containing solid titanium trichloride and a third component (a compound shown in Table 3 in an amount of 0.1 time the molar amount of TiCl$_3$) were fed into a dried and nitrogen-displaced SUS 304 autoclave (with a capacity of 2 liters), followed by additional introduction of 0.5 kg/cm$^2$ of hydrogen. After heating the reaction mixture to the temperatures shown in Table 3, propylene was supplied in the manner of Example 1 to effect polymerization. The succeeding separation of the polypropylene powder mixture to the temperatures shown in Table 4, propylene gas was injected into the gaseous phase at the feed rates and for the periods shown in Table 4. The partial pressure of propylene as read on the pressure gauge in communication with the gaseous phase during this operation was as shown in Table 4. Then the solid component was allowed to settle and, after removing the supernatant by decantation, the product was washed several times with n-hexane to obtain a propylene polymer-containing solid titanium trichloride.

The thus obtained propylene polymer-containing solid titanium trichloride, diethylaluminum chloride, n-hexane, propylene, hydrogen and a third catalyst component were continuously supplied to a 400-liter reactor for continuous polymerization at the temperatures shown in Table 4, in the manner of Examples 6–7. The succeeding separation of the polypropylene powder and film formation were also in the manner of Examples 6–7. The results are shown in Table 4.

COMPARATIVE EXAMPLE 6

A solid titanium trichloride obtained from the process of Example 1(a) was treated in the same manner as Example 14 except that, in the pretreatment step, the partial pressure of propylene gas in the gaseous phase was maintained at 1.2 kg/cm$^2$, thereby obtaining a propylene-containing solid titanium trichloride, and the succeeding continuous propylene polymerization and film formation were also performed in the manner of Example 14. The results are shown in Table 4.

As noted from this table, the 30µ water-cooled film obtained from this comparative example showed numerous "fish-eyes."

Table 4

| | Pretreatment step | | | | Principal polymerization | | | | Results | | | |
|---|---|---|---|---|---|---|---|---|---|---|---|---|
| | | | | | | Polypropylene | | | | | | |
| | Temp. (°C.) | ppy feed rate (g. ppy/g. TiCl$_3$. hr) | Pppy (kg/cm$^2$) | Treating time (hr) | Product Composition (g. pp/ g. TiCl$_3$) | Temp. (°C.) | 3rd component | production rate (kg/ hr) | Non-crystalline production rate (kg/hr) | Catalyst feed rate (g. TiCl$_3$ /hr) | K$_o$ | Non-crystalline Polymer yield (wt %) | ρ$_B$ (g/ cc) | Nr. of fish eyes/ 1500 cm$^2$ |
| Ex. 13 | 60 | 2.1 | 0.2 | 1.5 | 3.2 | 65 | TPP | 18.9 | 0.34 | 1.97 | 160 | 1.8 | 0.48 | 10 |
| Ex. 14 | 35 | 4.7 | 0.4 | 1.0 | 4.7 | 60 | TPP | 18.9 | 0.30 | 2.25 | 140 | 1.6 | 0.50 | 8 |
| Comparative Ex. 6 | 35 | 9.6 | 1.2 | 0.5 | 4.8 | 60 | TPP | 18.9 | 0.34 | 2.25 | 140 | 1.8 | 0.48 | >200 |

What is claimed is:

1. A solid titanium trichloride catalyst containing a polymer of propylene produced by the process comprising:
   (a) forming a homogeneous solution comprising titanium trichloride and an ether;
   (b) heating said homogeneous solution at a temperature of lower than 150° C. to form a precipitate of solid titanium trichloride;
   (c) separating said precipitate;
   (d) mixing said separated precipitate, an inert solvent and an organoaluminum compound in a closed vessel; and
   (e) introducing propylene into said vessel for absorption into the liquid phase in said vessel at a feed rate within the range of 1 to 10 grams per hour per gram of said solid titanium trichloride, maintaining the partial pressure of said propylene in the gaseous phase in said vessel at less than 1 kg/cm$^2$, the amount of propylene so introduced being controlled so that the amount of propylene absorbed is 0.1 to 50 times the weight of said solid titanium trichloride.

2. The solid propylene polymer-containing titanium trichloride of claim 1, produced by the process wherein the homogeneous solution further comprises a hydrocarbon solvent.

3. The propylene polymer-containing solid titanium trichloride of claim 1, produced by the process wherein the propylene is injected into the liquid phase within the vessel.

4. The propylene polymer-containing solid titanium trichloride of claim 3, produced by the process wherein the partial pressure of propylene in the gaseous phase is maintained at less than 0.2 kg/cm$^2$.

5. The propylene polymer-containing solid titanium trichloride of claim 1, produced by the process wherein propylene is supplied into the gaseous phase in the vessel.

6. The propylene polymer-containing solid titanium trichloride of claim 5, produced by the process wherein the partial pressure of propylene in the gaseous phase is maintained at less than 0.6 kg/cm$^2$.

7. The propylene polymer-containing solid titanium trichloride of claim 1, produced by the process wherein substantially no hydrogen is present within the reaction vessel.

8. The propylene polymer-containing solid titanium trichloride of claim 1, produced by the process wherein the propylene is supplied at a temperature of 0° to 70° C.

9. The propylene polymer-containing solid titanium trichloride of claim 1, produced by a process further comprising the steps of separating the propylene polymer-containing solid titanium trichloride produced in step (d) from the liquid phase and then washing with an inert solvent.

10. A propylene polymer-containing solid titanium trichloride of claim 1, produced by a process wherein the propylene is introduced with a small amount of at least one other α-olefin.

11. In a method of producing a propylene polymer the improvement comprising polymerizing the propylene in the presence of a catalyst admixture of (a) the propylene polymer-containing solid titanium trichloride of claim 1, and (b) an organoaluminum compound.

12. The method of claim 11, wherein the propylene is polymerized together with a small quantity of at least one other α-olefin in the presence of said catalyst admixture.

13. The method of claim 11, wherein propylene is polymerized at a temperature of 50° to 90° C. in the presence of said catalyst admixture.

14. The method of claim 11, wherein the propylene is polymerized under a partial pressure of propylene of 1 to 100 atm. in the presence of said catalyst admixture.

15. The method of claim 11, wherien the propylene polymer is produced in a yield of more than 5,000 times the weight of solid titanium trichloride in the presence of said catalyst admixture.

16. A process for producing a solid titanium trichloride containing a polymer of propylene comprising the steps of:
   (a) forming a homogeneous solution comprising titanium trichloride and an ether;
   (b) heating said homogeneous solution at a temperature of lower than 150° C. to form a precipitate of solid titanium trichloride;
   (c) separating said precipitate;

(d) mixing said separated solid titanium trichloride, an inert solvent and an organoaluminum compound in a closed vessel; and
(e) introducing propylene into said vessel for absorption into the liquid phase in said vessel at a feed rate within the range of 1 to 10 grams per hour per gram of said solid titanium trichloride, maintaining the partial pressure of said propylene in the gaseous phase in said vessel at less than 1 kg/cm$^2$, the amount of propylene so introduced being controlled so that the amount of propylene absorbed is 0.1 to 50 times the weight of said solid titanium trichloride.

* * * * *